H. L. SMITH.
MACHINE FOR ELECTRICALLY WELDING WIRE FABRICS.
APPLICATION FILED SEPT. 18, 1907.
1,069,197.
Patented Aug. 5, 1913.
6 SHEETS—SHEET 1.
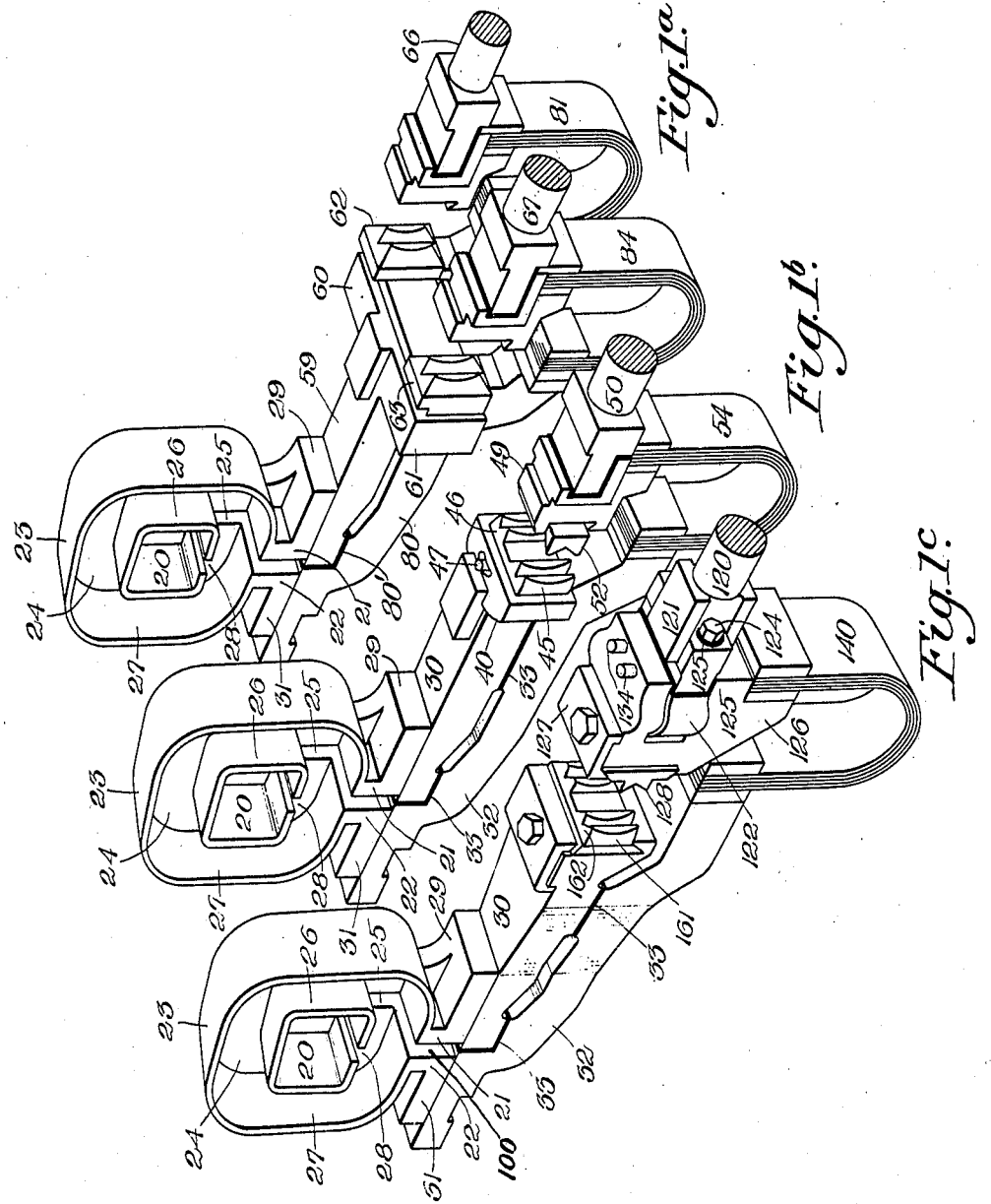

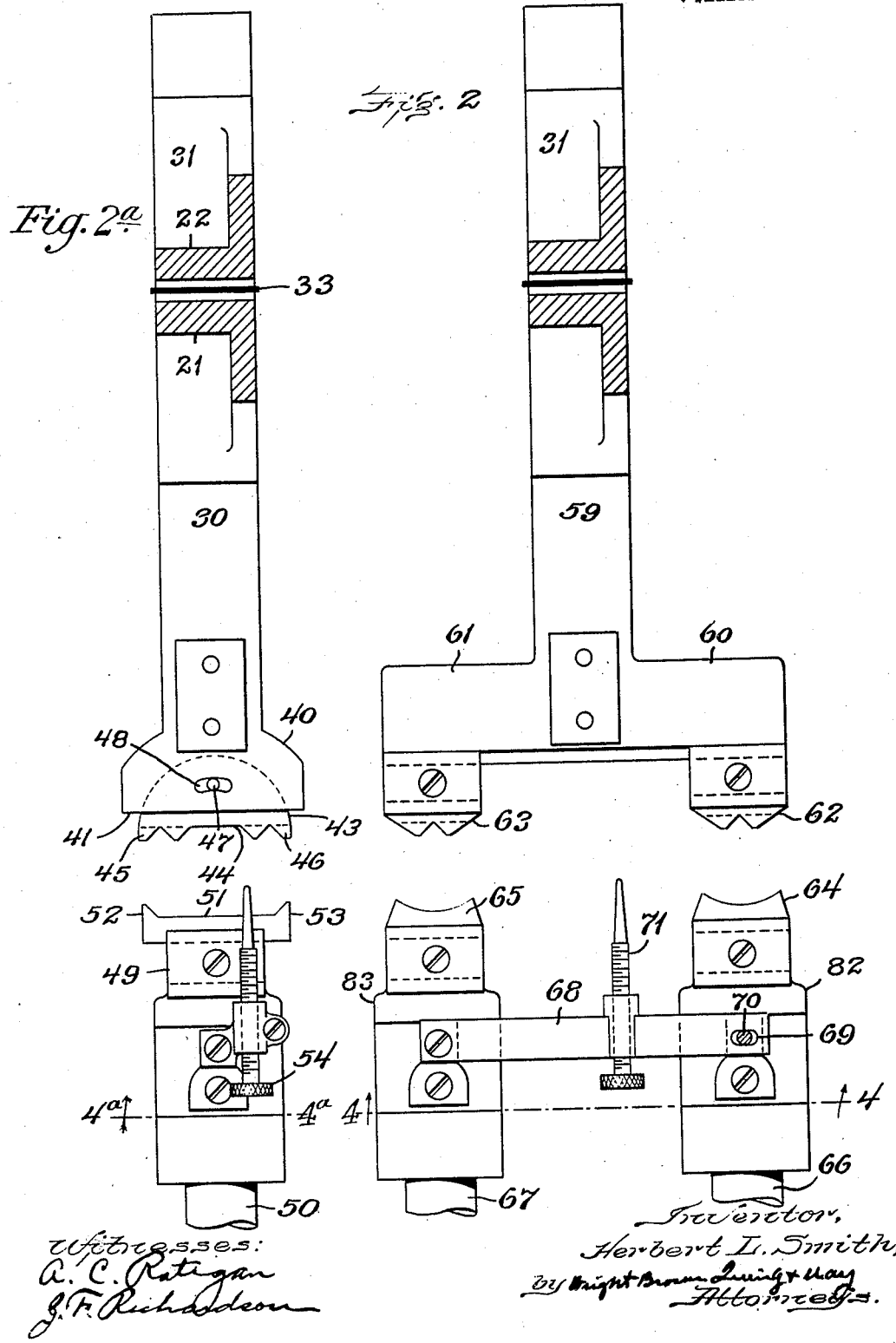

H. L. SMITH.
MACHINE FOR ELECTRICALLY WELDING WIRE FABRICS.
APPLICATION FILED SEPT. 18, 1907.
1,069,197.
Patented Aug. 5, 1913.
6 SHEETS—SHEET 3.
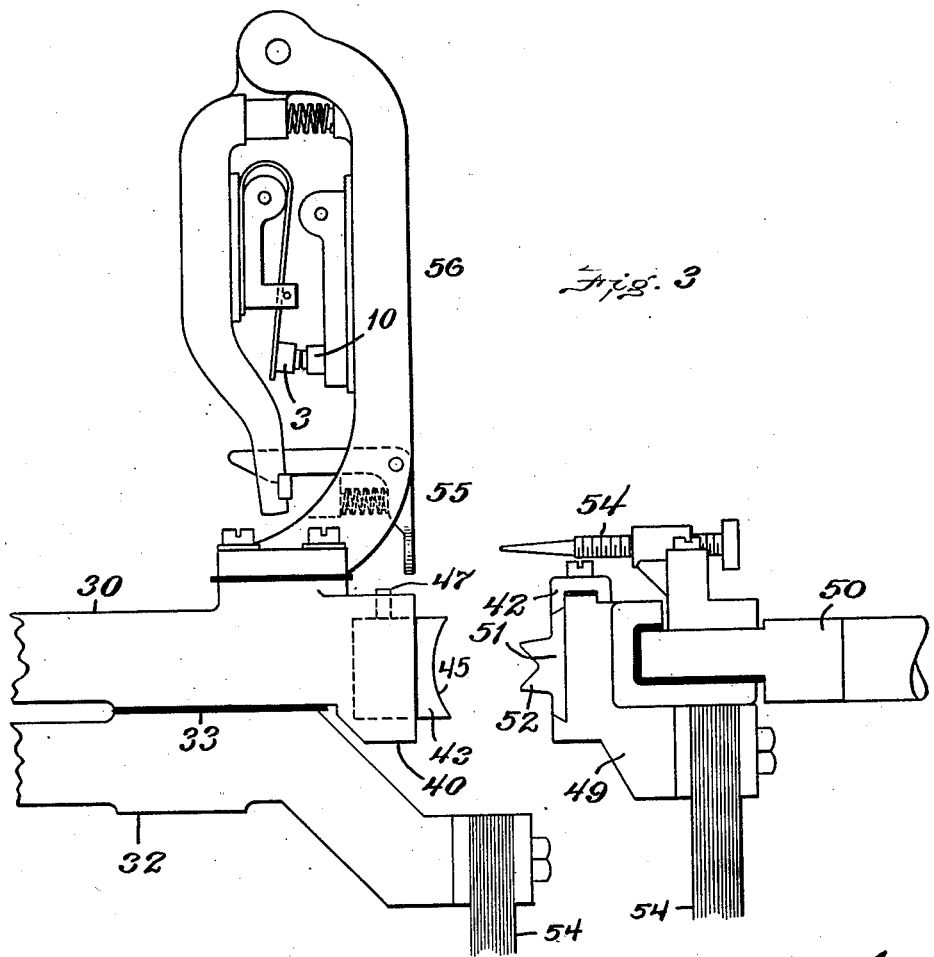
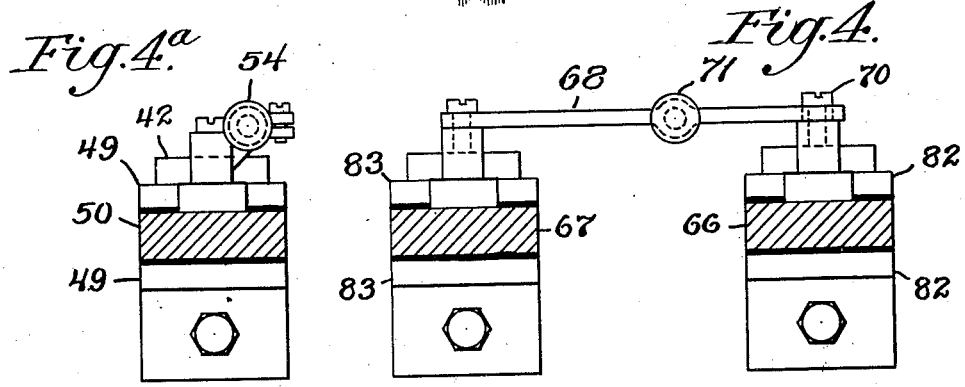

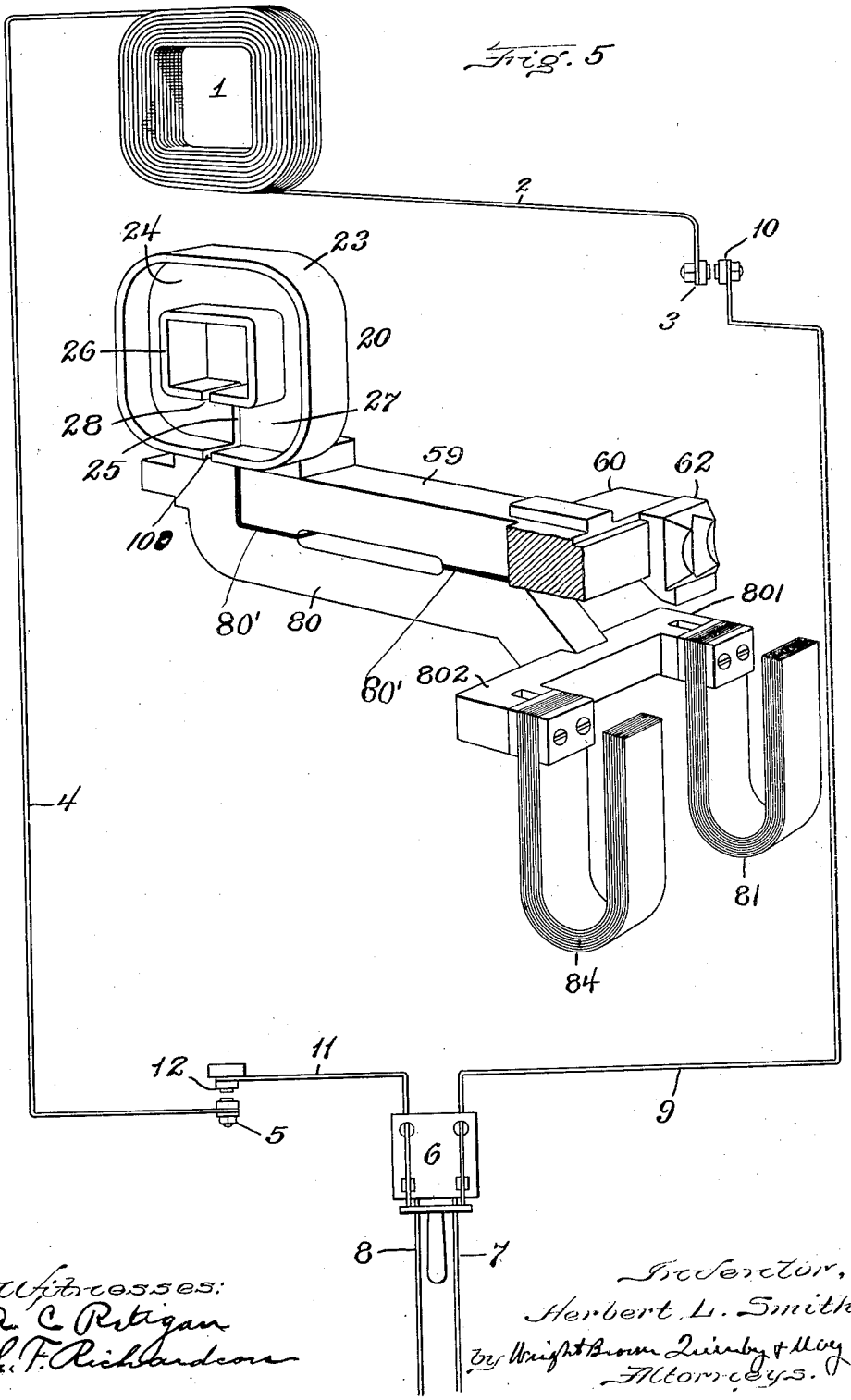

H. L. SMITH.
MACHINE FOR ELECTRICALLY WELDING WIRE FABRICS.
APPLICATION FILED SEPT. 18, 1907.
1,069,197.
Patented Aug. 5, 1913.
6 SHEETS—SHEET 5.
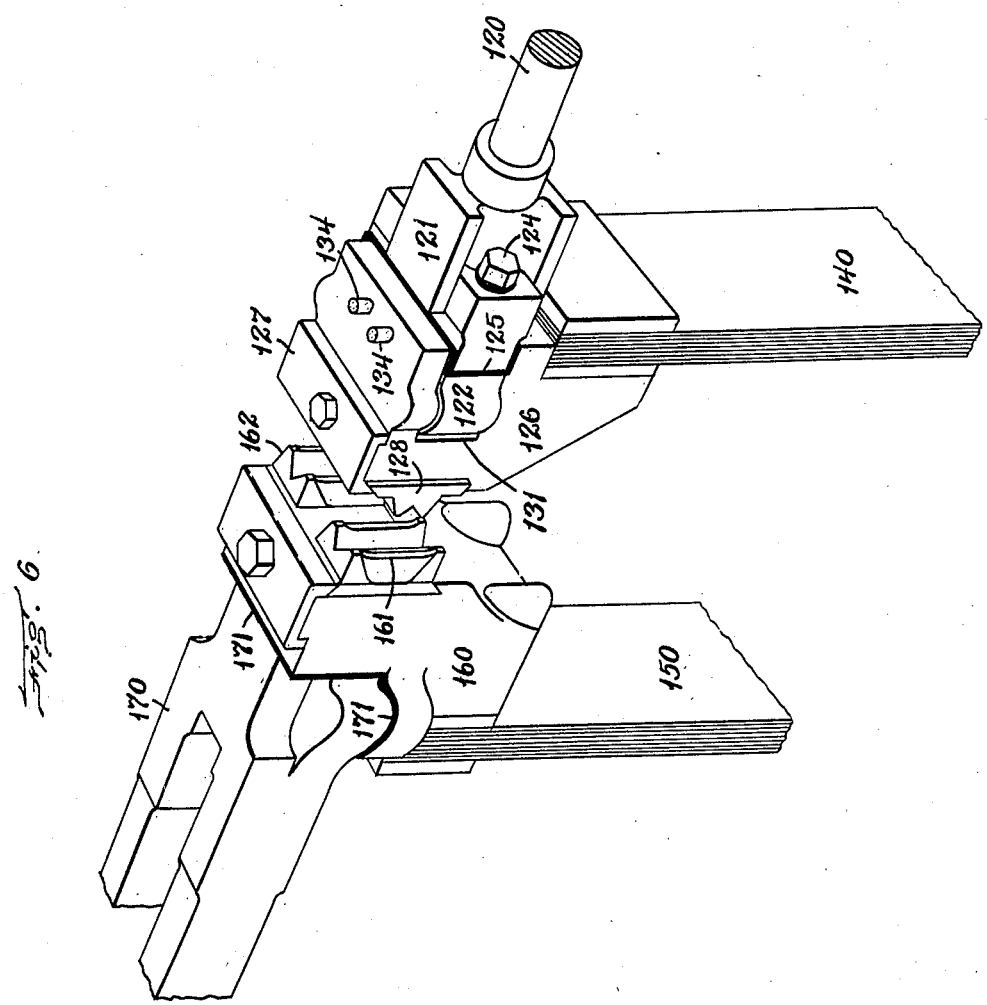

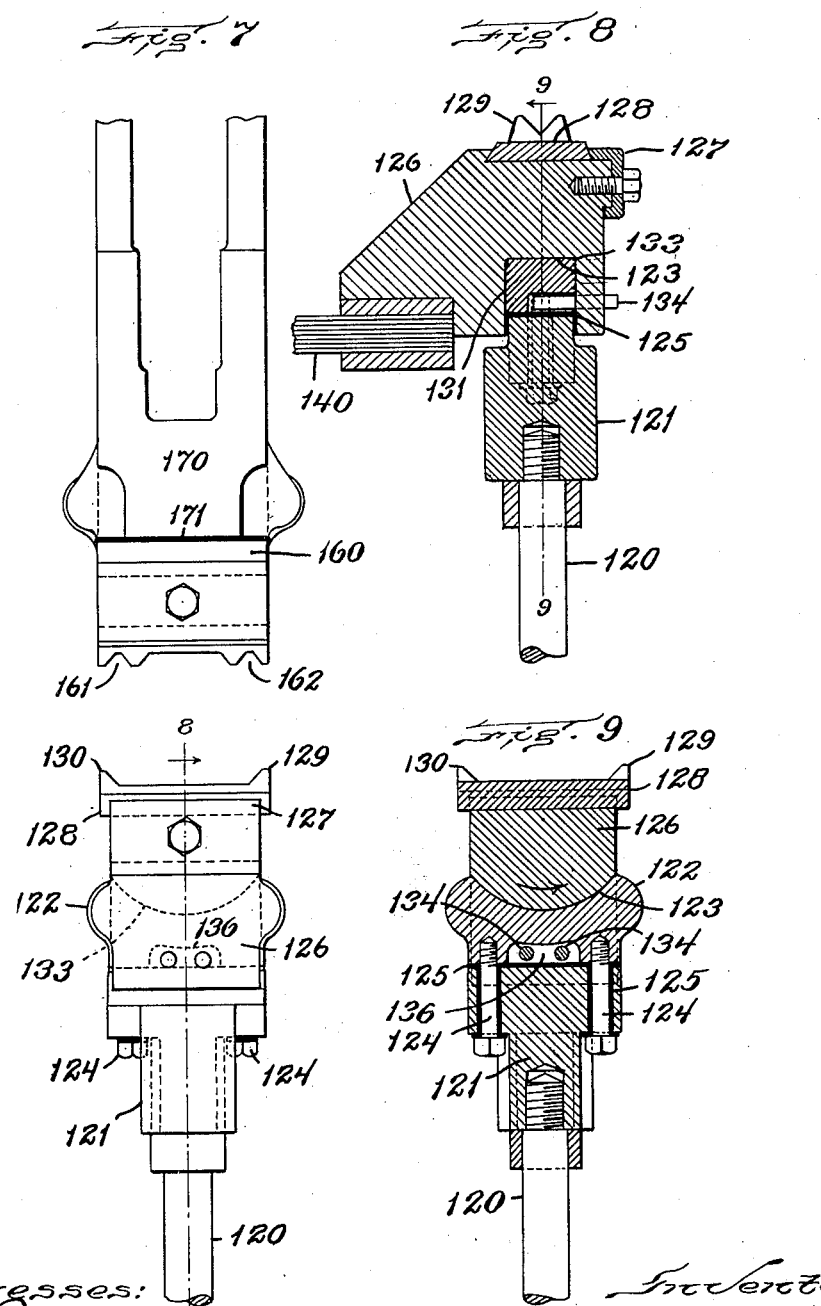

UNITED STATES PATENT OFFICE.

HERBERT L. SMITH, OF CLINTON, MASSACHUSETTS, ASSIGNOR TO CLINTON WIRE CLOTH COMPANY, OF BOSTON, MASSACHUSETTS, A CORPORATION OF MASSACHUSETTS.

MACHINE FOR ELECTRICALLY WELDING WIRE FABRICS.

1,069,197.    Specification of Letters Patent.    Patented Aug. 5, 1913.

Application filed September 18, 1907. Serial No. 393,510.

*To all whom it may concern:*

Be it known that I, HERBERT L. SMITH, of Clinton, in the county of Worcester and State of Massachusetts, have invented certain new and useful Improvements in Machines for Electrically Welding Wire Fabrics, of which the following is a specification.

This invention relates to an improvement in machines for electrically welding wire fabrics.

Figure 1$^a$ is a perspective view of a part of the welding apparatus showing one arrangement of the welding-jaws and the connected secondary circuit of the transformer, the rest of the machine being omitted. Fig. 1$^b$ is a like view of a different arrangement of the jaws. Fig. 1$^c$ is a like view of a still different arrangement of the jaws. Fig. 2 is a top plan view of the welding jaws shown at the right in Fig. 1, the transformer being omitted and the contact-breaker screws being shown mounted on the front welding jaws. Fig. 2$^a$ is a top plan view of the metal welding-jaws in Fig. 1, the transformer being omitted and the contact breaker screws being mounted upon the front welding-jaw, the particular form of apparatus shown being the middle member of Fig. 1. Fig. 3 in side elevation, shows my improved welding apparatus, the contact-breaker screw appearing at the right on the plunger carrying the movable welding jaw, while the circuit-breaker appears at the left in place on the bar supporting the stationary welding-jaw. Fig. 4 is a cross-sectional view on the line 4—4 of Fig. 2, looking in the direction of the arrow, showing the arrangement of the contact-screws and their supporting parts. Fig. 4$^a$ is a cross-sectional view on line 4$^a$—4$^a$ of Fig. 2$^a$, looking in the direction of the arrow, showing the arrangement of the contact screw and its supporting parts. Fig. 5 is a composite view, partly in perspective, partly in diagram, showing the primary circuit and its controls and the secondary terminals, the primary and secondary coils shown separated from each other. Fig. 6 is a perspective view similar to Fig. 1, but showing a proposed construction of movable contact block mounted on the front or right-hand plunger, the particular form of apparatus shown being the left hand member of Fig. 1. Fig. 7 is a top plan view of the parts shown in Fig. 6. Fig. 8 is a longitudinal sectional view on a vertical plane taken on line 8—8 of Fig. 7, looking in the direction of the arrow, showing the connection between the plunger and its swiveled jaw. Fig. 9 is a longitudinal sectional view on a horizontal plane taken on line 9—9 of Fig. 8, looking in the direction of the arrow, showing among other features, the studs for holding the swiveled jaw on the end of the plunger.

The same letters of reference indicate the same parts in all of the figures.

This invention is an improvement upon the mechanisms shown in U. S. patent to Perry, No. 813,823, dated February 27, 1906, to which patent reference may be had for the general features of such a machine, such features, as well as the framework of the machine, not being here shown, since they form no part of my invention.

1, (Fig. 5) represents the primary coil of a transformer, one end of which 2, leads to a circuit-controlling member 3, the other end 4, leading to a circuit-controlling member 5. A switch is represented at 6, connected with primary wires 7, 8, running to any desired source of power. A wire 9, runs from said switch to a circuit-controlling member 10, complemental to the member 3. A wire 11 runs from said switch to a circuit-controlling member 12, complemental to the member 5. The switch is hand-operated, while the controls 3, 10, and 5, 12 are automatically-operated, as set out in the Perry patent, to open and close the primary circuit.

20 represents the secondary coil, so called, of the transformer, which comprises two heavy copper standards 21, 22, connected at their upper end by a thick copper plate 23, curved to a general hoop shape, the said standards being separated and forming a space or slot 100, corresponding to the insulation 80′ between the bars 59 and 80, in the form of apparatus shown at the right in Fig. 1, and corresponding to the insulation 33 between the bars 30 and 32, in the form of apparatus shown to the left in Fig. 1. The rear edges of the said plates are joined by a thick copper plate 24 formed with a slit 25 that in effect constitutes a continuation of the space between the standards 21, 22 and the slot 100. A second thick copper plate 26, having a general hoop shape, but of less diameter than that formed by the plate 23, is arranged inside the latter with its rear edge connected to the plate 24, leaving a space or chamber 27 between said plates. The slot 25 in the plate 24 is extended up to and is substantially coincident with the upper surface of the bottom turn of the plate 26, the plate 26 in said turn being formed with a slot 28, that forms in effect a continuation of the slot 25 and is positioned over the space between the standards 21, 22. The standards 21, 22, plates 23, 24, and 26, are preferably cast integral for electrical and mechanical reasons well known in the art. The standard 21 is formed with an integral foot piece 29 secured to the top of a heavy copper bar 30, that in effect constitutes one terminal of the transformer-secondary. The standard 22 has a like foot 31 secured to a heavy copper bar 32, that constitutes the other terminal of the transformer secondary. The bar 30 is placed over the bar 32, but separated therefrom by insulating material 33. The chamber 27 is of a suitable size to receive and hold the primary coil 1, said coil 1, standards 21, 22, plates 23, 24, and 26, constituting my improved transformer having as secondary terminals the bars 30 and 32.

It is desirable in welding the intersections of wires in small meshes to control a plurality of welds by one circuit-breaker common to all said welds, as set out in patent to Perry, No. 795,084. In connection with my improved transformer I have shown an improved mechanism for effecting such plurality of welds from a circuit-breaker common to all said welds. The bar 30 (Figs. 1 and 2ª) is formed with a semi-circular enlarged end 40, with the diameter 41 thereof forming the end of the enlargement. In the end 40 is formed a semi-circular recess, in which is arranged a complemental shaped copper block 43, the front or flat face 44 of said block forming the diameter thereof being formed with two independent strand and cross wire-engaging members 45, 46. A pin 47 in said block 43 and arranged in a curved slot 48, in the block 40, maintains the block 43 in place and permits said block to turn in its socket. The front end of the bar 32 is connected by flexible copper plates 54 to a copper block 49, carried by, but insulated from, a reciprocating plunger 50. Upon the face of the copper block 49 is secured by a clamp 42 a contact plate 51, having two members 52, 53, for engaging strand and stay wires, and being positioned opposite and complemental to the members 45 and 46, respectively. The block 43 by its arrangement, can yield by turning to equalize an inequality in size, etc., of wires, as the wires are positioned and welded at the two points simultaneously. The plunger 50 carries an adjustable contact-breaker screw 54 that is arranged to engage and trip a lever 55 of a circuit-breaker 56, carried by, but insulated from the bar 30, back of the end 40. The circuit breaker 56 and contact-breaker screw 54 require no detailed description, as they are described and claimed in the patent to Perry, No. 813,823. It will be evident that the forward circuit-breaking movement of the screw 54, upon the softening of the metal, will correspond to the average movement of the jaws toward each other at the two welding points, the welding circuit being interrupted at the same forward position of the screw 54, whether the jaws are at the same or different distances apart at the two welds. By this arrangement, a substantially uniform welding result is secured without danger of burning out the contact plates or missing a weld, as would be the case were there no way of averaging the welding movement at the two points and controlling the breaking of the welding current by said average movement.

Instead of securing the foregoing result by the movable block 43, I may employ the arrangement shown in Figs. 1 and 2ª. The upper copper secondary terminal 59 at its end is formed with right angle extensions 60, 61, each at its end carrying a stationary contact plate 62, 63, respectively, that are arranged opposite to and complemental to the contact plates 64, 65, carried by, but insulated from, the plungers 66, 67. A bar 68 is pivoted at one end to the plunger 67 and formed at its other end with a slot 69, arranged on a pin 70, carried by the plunger 66. An adjustable contact-breaker screw 71 is carried by the bar 68, and arranged to engage a lever 55 of a circuit-breaker 56 (not shown) carried by the terminal 59, as is shown in connection with the terminal 30 in Fig. 3. The bar 59 is arranged over a bar 80 similar to the bar 32. The bar 80 is separated from the bar 59 by insulating material 80'. The rear ends of the bars 59 and 80 are connected to the secondary of a transformer, as in the case of the bars 30, 32. The front end of the bar 80 is provided with right angle extensions 801, 802, corresponding to the extensions 60, 61. Flexible copper plates 81 connect the end of the extension 801 with a contact-plate supporting member 82, carried by, but insulated from, the plunger 66. In like manner, the contact-plate supporting member 83, carried by, but insulated from, the plunger 67, is connected to the other extension 802 of the bar 80 by flexible copper plates 84. The plungers 60, 67 are independently operated, but the circuit-breaking motion of the screw 71 will be due to the average forward welding motion of the two contact-plates 64, 65.

While in Fig. 1 the secondary is provided with standards 21, 22, I prefer the form shown in Fig. 5, where such standards are omitted and the lower ends of the plate 23 rest directly upon the foot-piece 29.

Referring to Figs. 6, 7, 8 and 9, 120 represents the front plunger, the end of which is screw-threaded into a block 121. 122 represents a block formed with an inwardly-curved face 123. 124, 124 represent screws connecting the block 122 with the block 121. 125 represents insulating material insulating the screws and block 122 from the block 121. 126 represents a copper block, constituting a welding jaw, to which, by means of a cap 127, is secured a contact plate 128 having two welding points 129 130. The block 126 is formed with a slot 131 in which is arranged the block 122, and the rear wall of the slot 131 is formed with a projecting curved face 133 complemental to and fitting the curved face 123, thus permitting the block 126 to have a swiveling action with reference to the block 122. Studs 134 carried by the block 126 are arranged in a recess 136 in the block 122 (see Fig. 9), and serve to prevent the block 126 being separated from the block 122. 140 represents a flexible connection extending from the block 126 to the secondary terminal of the transformer (not shown). 150 represents a flexible connection, connecting the complemental welding jaw 160 to a terminal of the transformer (not shown). The block or jaw 160 is shown as connected to, but insulated from, the bar 170 by insulating material appearing at 171. The block 160 carries two welding points 161 162.

In Fig. 1, while three sets of welding-jaws are shown, it is to be understood that any number may be employed. It is further to be understood that the machine may be made up of welding-jaws like any one of the three pairs shown, or that the machine may be made up of any arrangement of welding-jaws, like, for instance, that shown in Fig. 1, or any other arrangement, since in each case each pair of jaws will be provided with a plurality of welding points and a flexible construction whereby the jaws can yield to accommodate themselves to inequalities of the work.

By my described arrangement, I secure flexibility of one of the contact-plates with reference to the other without interposing an open sliding connection in the circuit, as is the case in the form and arrangement of the jaws shown in Fig. 2, since whatever may be the position of the block 126, the circuit enters said block directly and not by way of the block 122.

Having thus explained the nature of my invention and described a way of constructing and using the same, though without attempting to set forth all of the forms in which it may be made, or all of the modes of its use, what I claim and desire to secure by Letters Patent is:—

1. A welding apparatus for wire fabrics, comprising a transformer, a stationary welding-jaw formed with means for holding a plurality of pressure members, each arranged to exert upsetting pressure to form an independent weld, connections between said jaw and said transformer, a movable welding-jaw formed with means for holding the work, a plunger bar loosely connected to, but insulated from said jaw, whereby one can turn with relation to the other to compensate for inequalities of said work, and flexible connections between said jaw and said transformer.

2. A welding apparatus for wire fabrics comprising a transformer, a stationary welding-jaw, connections between said jaw and transformer, a complemental movable welding-jaw consisting of a heavy copper block, flexible connections between said block and said transformer, a curved seat or recess formed in said block, a contact plate, a connecting member arranged in and confined in said recess, and means for reciprocating said block connected to, but insulated from said connecting member.

3. An electric welding apparatus provided with a transformer, a copper bar connected to one terminal of the secondary circuit of said transformer, a welding-jaw connected to said bar and provided with a plurality of work-engaging members, a second copper bar arranged beneath, but insulated from said first mentioned bar and connected to the other terminal of the secondary circuit of said transformer, a welding jaw connected to said second bar, and provided with a plurality of work engaging members, means for moving one of said welding-jaws toward and from the other to effect the upsetting pressure, and means whereby one or more of the working faces of one of said jaws may be moved with relation to the other to compensate for inequalities of the work.

In testimony whereof I have affixed my signature, in presence of two witnesses.

HERBERT L. SMITH.

Witnesses:
H. L. ROBBINS,
A. H. BROWN.